(No Model.)
H. C. SPALDING.
ELECTRIC CABLE.
No. 327,492. Patented Sept. 29, 1885.
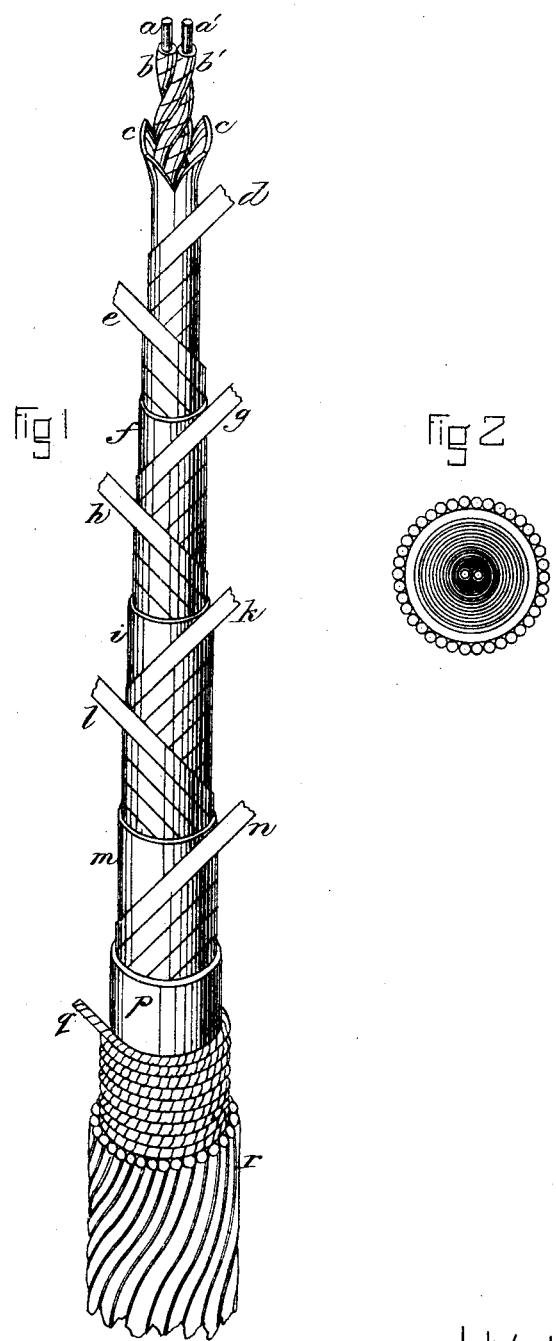
Witnesses
E. B. Welch
Aly. L. Hayes
Inventor
Henry C. Spalding

UNITED STATES PATENT OFFICE.

HENRY C. SPALDING, OF BOSTON, MASSACHUSETTS.

ELECTRIC CABLE.

SPECIFICATION forming part of Letters Patent No. 327,492, dated September 29, 1885.

Application filed December 5, 1883. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Electric Cables, of which the following is a specification, reference being had to the drawings accompanying and forming a part of the same.

In an application filed by me November 19, 1883, I have described a plan discovered by me for obviating induction and retardation in electrical cables, which consists in employing, in conjunction with two insulated conductors that constitute a round wire or complete circuit, an insulated metallic sheath. This principle, as I have elsewhere indicated, is applicable to various forms of electrical cable, the simplest construction being well adapted for aerial lines, or for such cables as are laid in receptacles or in conduits. In the case of submarine cables, however, or those which are exposed to similar conditions, great tensile strength, more perfect insulation, and greater precautions against retardation are necessary.

I have devised a plan of cable in which these qualities are present, and in the construction of which I have taken advantage not only of the principle to which I have above referred, but also certain other matters discovered by me, and which will be more fully hereinafter explained.

My present invention, therefore, consists of a cable for submarine or similar uses, in which two insulated conductors forming or adapted to form a complete or round-wire circuit are surrounded by a sufficient number of layers or sheaths of insulating material and metal to afford the desired strength and protection from electro-static and inductive disturbances, and, further, in certain details in the character and the plan of assemblage of these parts, which will be more particularly set forth.

In the drawings, which illustrate my invention, Figure 1 is a view of the cable, showing the central core and parts of the successive layers or sheaths. Fig. 2 is a cross-section of the cable.

The letters $a$ $a'$ designate copper conducting-wires; $b$ $b'$, spirally-wound coatings of paper, which is first saturated with paraffine and then coated with a resinous varnish. This method of insulation, as more fully set forth by me in another application, I have found to be very economical and durable, and to afford complete protection. In order to obtain a core as nearly round as possible, the wires $a$ $a'$ are twisted together, as shown. Around them I then apply a layer of insulating material composed of oppositely-laid strips, $c$ $c$, of an adhesive insulating material, preferably gutta-percha or an equivalent plastic material—such as caoutchouc, or thick soft paper prepared for the purpose and saturated with an insulating compound. These strips must be capable of being embedded in the depressions in the irregular surface of the core formed by twisting the conductors $a$ $a'$ together, so that a smooth and round surface is obtained, upon which the subsequent layers may be wound. Over the strips $c$ $c$ a strip of paper, $d$, is wound spirally, and over this a layer of metal is formed by winding spirally a strip of tin-foil, $e$. A coating of resinous varnish, $f$, is then applied over the foil. The next layer consists of a spirally-wound paper strip, $g$, which is applied while the varnish $f$ is still soft, so that it may be embedded in the same. Over the paper $g$ is wound a strip of tin-foil, $h$, to which a coating of the resinous varnish $i$ is applied. Around this a strip of prepared paper, $k$, is wound, which in turn is inclosed by a spirally-wound layer of tin-foil, $l$. This latter is covered with a coating, $m$, of the varnish, in which is wound a strip, $n$, of prepared paper. Around the central core, composed of the twisted strands or wires $a$ $a'$, there are thus applied three layers or sheaths of metal, with interposed layers of insulating material. The inner layer, or that designated by the letter $d$, acts in conjunction with the two wires forming the path for the current to establish an electrical equilibrium, as it is equally but oppositely affected, the current passing in said wires in opposite directions. Inductive disturbances and retardation are thus materially lessened. By adding a second sheathing, $h$, of metal, the deleterious effects of retardation are still further decreased, while the third sheathing, $l$, practically obliterates all traces of retardation due to the earth's electricity. The materials used in the construction of the cables render it possible and practicable to apply the stated number of layers without materially increasing the diameter of the cable. The paper strips are very thin, and both they and the metal-foil strips should be wound oppositely in order that greater compactness and flexibility may be obtained.

To give the requisite strength and to prevent abrasion without impairing the flexibility of the cable, I coat the outer layer of paper, $n$, with a bituminous substance, $p$, for which refined Trinidad asphalt, rendered permanently plastic by the residuum of distilled petroleum, is well adapted. Upon this substance I then wind tightly a serving of twine, $q$, which sinks into the bituminous coating and becomes thoroughly saturated with the same. The cable thus compressed and rendered solid is finished by the application of the armor, which may be of the character usually employed.

The distinctive features of the cable which I have now described, as compared with those made the subject of other applications filed by me, are that the two insulated conductors are inclosed by a sheathing of a plastic material compressed around them so as to form a round core upon which the layers of insulating material are wound, and also that the two insulated wires, or, in other words, the metallic or round-wire circuit inclosed or surrounded by insulated metallic sheaths, is inclosed and protected by a flexible insulating jacket and armor.

I may vary the construction and arrangement of the component parts of this cable in certain particulars without departure from the invention. For instance, I am not confined to the use of a single pair of insulated conductors, nor to the specified manner in which they are formed into the core. I may also employ, in lieu of the paper strips, similar strips of other like materials, and for the metal sheaths I may use various kinds of foil.

I would state, however, that for the outer sheath, or that designated $l$, pure tin is desirable, from the greater protection which it affords against borers and its property of resisting corrosion.

I have now described my invention in its most practicable and useful form.

What I claim is—

1. In an electrical cable, the combination, with two insulated conductors adapted to form a complete or round-wire circuit, of an insulated metallic sheath or sheaths surrounding said conductors, and a flexible insulating and protective sheathing or armor, substantially as set forth.

2. In an electric cable, the combination, with two insulated conductors twisted together and adapted to form a complete or round-wire circuit, of a plastic envelope applied to and compressed around said conductors to form a smooth and round core for the outer layers or sheathings, substantially as described.

3. In an electric cable, the combination, with two insulated conductors forming or adapted to be used as a complete metallic or round-wire circuit, of three insulated metallic sheaths and a protective flexible armor, substantially as set forth.

4. In an electrical cable, the combination, with the insulated conductors $a\ a'$, of the insulating envelope composed of the oppositely-laid strips $c\ c$, of plastic material, compressed around the conductors, substantially as and for the purpose specified.

5. In an electric cable, the combination, with two insulated conductors forming or adapted to be used as a complete or round-wire circuit, layers or sheaths surrounding the same, and consisting of spirally-wound strips of paper and metal, and a flexible protective jacket or armor, all substantially as set forth.

In witness whereof I have hereunto signed my name in the presence of two subscribing witnesses.

HENRY C. SPALDING.

Witnesses:
ALEX. L. HAYES,
E. B. WELCH.